United States Patent
Nimri et al.

(10) Patent No.: US 8,447,023 B2
(45) Date of Patent: May 21, 2013

(54) AUTOMATIC AUDIO PRIORITY DESIGNATION DURING CONFERENCE

(75) Inventors: Alain Nimri, Austin, TX (US); Rick Flott, Austin, TX (US)

(73) Assignee: Polycom, Inc., San Jose, CA (US)

( * ) Notice: Subject to any disclaimer, the term of this patent is extended or adjusted under 35 U.S.C. 154(b) by 651 days.

(21) Appl. No.: 12/697,844

(22) Filed: Feb. 1, 2010

(65) Prior Publication Data

US 2011/0187814 A1    Aug. 4, 2011

(51) Int. Cl.
*H04M 3/42* (2006.01)

(52) U.S. Cl.
USPC ............... 379/202.01; 348/14.08; 348/14.09; 370/260; 370/263; 370/265; 370/266; 704/204

(58) Field of Classification Search
USPC ................... 348/14.01–14.16; 370/259–271, 370/351–356; 709/201–207, 217–248
See application file for complete search history.

(56) References Cited

U.S. PATENT DOCUMENTS

| | | | |
|---|---|---|---|
| 5,315,633 A | | 5/1994 | Champa |
| 5,440,624 A | * | 8/1995 | Schoof, II ................. 379/202.01 |
| 5,768,263 A | * | 6/1998 | Tischler et al. ............... 370/263 |
| 5,959,667 A | * | 9/1999 | Maeng ..................... 348/211.99 |
| 5,991,277 A | * | 11/1999 | Maeng et al. ................. 370/263 |
| 6,006,253 A | | 12/1999 | Kumar et al. |
| 6,025,870 A | * | 2/2000 | Hardy ........................... 348/14.1 |
| 6,128,649 A | * | 10/2000 | Smith et al. ................... 709/217 |
| 6,300,973 B1 | | 10/2001 | Feder et al. |
| 6,351,731 B1 | | 2/2002 | Anderson et al. |
| 6,453,285 B1 | * | 9/2002 | Anderson et al. ............. 704/210 |
| 6,496,216 B2 | | 12/2002 | Feder et al. |
| 6,744,460 B1 | * | 6/2004 | Nimri et al. ................. 348/14.11 |
| 6,760,422 B1 | | 7/2004 | Kowal et al. |
| 6,775,247 B1 | * | 8/2004 | Shaffer et al. ................. 370/260 |
| 6,950,119 B2 | * | 9/2005 | Kakii et al. ................. 348/14.08 |
| 6,989,856 B2 | * | 1/2006 | Firestone et al. .......... 348/14.09 |
| 7,176,957 B2 | * | 2/2007 | Ivashin et al. .............. 348/14.09 |
| 7,454,460 B2 | * | 11/2008 | Ivashin ......................... 709/203 |
| 7,653,013 B1 | * | 1/2010 | Moran .......................... 370/261 |
| 8,060,366 B1 | * | 11/2011 | Maganti et al. ............... 704/246 |
| 2002/0123895 A1 | | 9/2002 | Potekhin et al. |
| 2002/0159394 A1 | | 10/2002 | Decker et al. |
| 2002/0188731 A1 | | 12/2002 | Potekhin et al. |
| 2003/0174202 A1 | * | 9/2003 | Eshkoli et al. ............. 348/14.08 |
| 2003/0223562 A1 | * | 12/2003 | Cui et al. ................. 379/202.01 |

(Continued)

FOREIGN PATENT DOCUMENTS

JP    63-003589 A    1/1988
JP    10-276236 A    10/1998

*Primary Examiner* — Hemant Patel
(74) *Attorney, Agent, or Firm* — Wong, Cabello, Lutsch, Rutherford & Brucculeri, LLP

(57) ABSTRACT

During a conference, a multipoint control unit (MCU) designates priority and non-priority endpoints. The MCU forms priority audio from the priority endpoint and sends that audio to the other endpoints at a normal level. However, the MCU forms non-priority audio from the non-priority endpoint and handles that audio based on whether the input audio from the priority endpoint is from speaking or not. If the priority endpoint's audio indicates a participant at that endpoint is speaking, then the MCU sends the non-priority audio to the other endpoints at a reduced level. Designation of which endpoint has priority can be based on which endpoint has a current duration of audio indicative of speech that is longer than other endpoints. Alternatively, the designation can be based on which endpoint is currently presenting content during the conference or based on a mix of speech audio and content presentation.

39 Claims, 5 Drawing Sheets

U.S. PATENT DOCUMENTS

| | | |
|---|---|---|
| 2004/0042553 A1 | 3/2004 | Elbaze et al. |
| 2005/0280701 A1* | 12/2005 | Wardell .................. 348/14.08 |
| 2006/0023062 A1 | 2/2006 | Elbaze et al. |
| 2006/0026002 A1 | 2/2006 | Potekhin et al. |
| 2006/0092269 A1* | 5/2006 | Baird et al. ............. 348/14.08 |
| 2007/0064094 A1* | 3/2007 | Potekhin et al. ........ 348/14.08 |
| 2007/0067387 A1* | 3/2007 | Jain et al. ................ 709/204 |
| 2007/0230372 A1* | 10/2007 | He et al. ................... 370/260 |
| 2009/0028316 A1* | 1/2009 | Jaiswal et al. ........ 379/202.01 |
| 2009/0168984 A1* | 7/2009 | Kreiner et al. ........ 379/202.01 |
| 2009/0220064 A1* | 9/2009 | Gorti et al. ............ 379/202.01 |
| 2010/0241432 A1* | 9/2010 | Michaelis ................ 704/260 |

\* cited by examiner

US 8,447,023 B2

AUTOMATIC AUDIO PRIORITY DESIGNATION DURING CONFERENCE

BACKGROUND

Various sites may participate at one time during a multisite conference. In such a situation, a participant at one of the sites may be presenting information and speaking, but noise, talking, and the like from the other sites may interfere. Currently, a presenter at the one site may have to ask all of the other sites in the multipoint conference to mute their microphones manually so that unwanted noise will be made part of the conference audio. Alternatively, a conference administrator may have to mute or reduce audio levels manually at a multipoint control unit so that undesirable audio does not become part of the conference.

As expected, these techniques may not always be effective. For example, an operator required to mute audio manually may not always perform that function so that conference participants will not be certain whether their audio is being muted or not, creating confusion. In addition, conferences can be dynamic, and multiple operators may have to mute audio manually at different times, which can create further confusion. Therefore, it is desirable to have an automatic way to eliminate or reduce audio from multipoint sites that are not presenting at a current time during a conference.

SUMMARY

During a conference, a multipoint control unit (MCU) designates priority and non-priority endpoints. The MCU then processes audio from the priority endpoint and sends priority audio to the other endpoints at a normal level. However, the MCU processes audio from the non-priority endpoint and sends non-priority audio to the other endpoints based on whether the input audio from the priority endpoint is indicative of speech or not. If the priority endpoint's audio indicates a participant at that endpoint is speaking, then the MCU sends the non-priority audio to the other endpoints at a controlled (i.e., reduced or muted) audio level. Designation of which endpoint has priority can be based on which endpoint has a current duration of audio indicative of speech that is longer than that of other endpoints. Alternatively or additionally, the designation can be based on which endpoint is currently presenting content during the conference.

The foregoing summary is not intended to summarize each potential embodiment or every aspect of the present disclosure.

DETAILED DESCRIPTION

Figure 1:
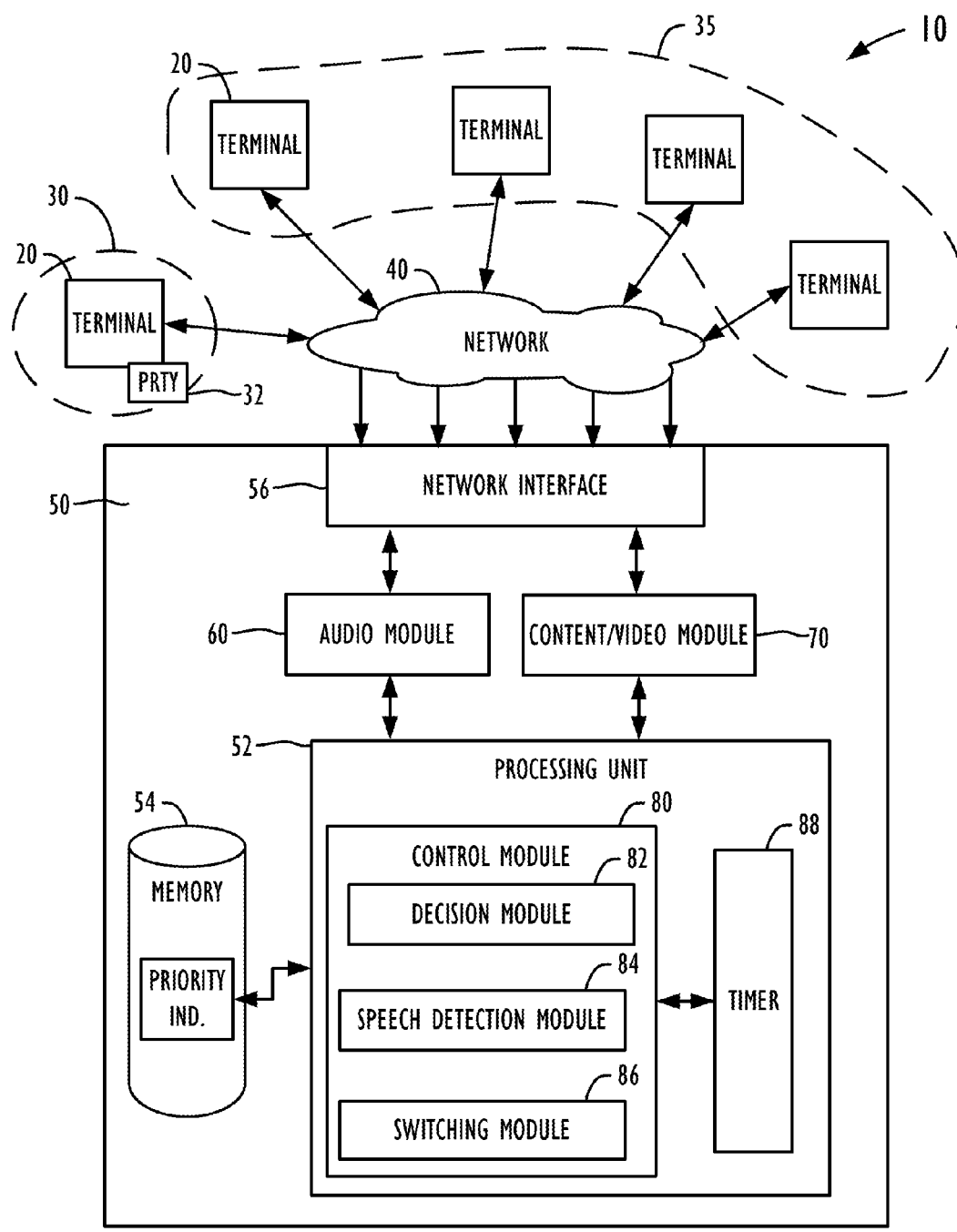
FIG. 1 illustrates a multipoint conference having a multipoint control unit and various participating endpoints.

A conferencing system 10 illustrated in FIG. 1 has endpoints 20 connected over communication networks 40 to a multipoint control unit (MCU) 50. Although described herein for videoconferencing between endpoints 20 capable of transmitting both audio and video, the system 10 can be an audio conferencing system in which audio is transmitted between endpoints 20. Additionally, the system 10 can be a mixed audio and video conferencing system in which some endpoints 20 participate as videoconferencing endpoints and others participate as only audio conferencing endpoints.

During a conference, the endpoints 20 provide audio and/or video signals. Thus, each endpoint 20 can have a loudspeaker, a display, a camera, a microphone, a user control device, or any combination thereof. In turn, the MCU 50 receives the signals from the endpoints 20, processes them for output, and then distributes the processed signals to the endpoints 20 according to the criteria of the conference. The particular details and functionality of various components of the MCU 50 are known in the art and are not described in exhaustive detail herein. (See e.g., U.S. Pat. No. 6,496,216 and U.S. Patent Pub No. 2002/0188731, which are incorporated herein by reference in their entireties.)

Typically, the MCU 50 can be an independent node in the system 10 or can located within an endpoint 20 in the conference. For their part, the endpoints 20 can be video communication endpoints, and the communication networks 40 can be packet-based networks, circuit switched networks, and/or other networks or communication protocols, such as ISDN, ATM, PSTN, cellular and/or IP. Information communicated between the endpoints 20 and the MCU 50 includes control signals, audio information, video information, and data. Yet, the disclosed systems and methods are not limited to a particular type of communication protocol or network.

As shown, the MCU 50 includes a processing unit 52, memory 54, and other necessary components. A network interface 56 connects the MCU 50 to the communication networks 40. Coupled to the network interface 56, an audio interface or module 60 allocates audio resources such as audio ports and the like for the conference, and a video interface or module 70 allocates video resources such as video ports and the like. A control module 80 controls operation of the MCU 50 and includes logic elements that process instructions and that control the audio and video modules 60 and 70. Each of these various modules 60/70/80 can be implemented as a combination of hardware and software in the MCU 50, as is well known.

At times during the conference, a participant at one particular endpoint 20 may be presenting (i.e., speaking, displaying content, etc.) for distribution to the other endpoints 20. Therefore, the audio received from this presenting endpoint 20 is preferably given priority over the audio from other endpoints 20 so that extraneous talking, noises, and the like are less likely to interfere with the presenting endpoint 20. Accordingly, the MCU 50 designates at least one endpoint 20 as a priority endpoint 30 and designates the remaining endpoints 20 as non-priority endpoints 35. Then, during the conference, the MCU 50 handles the audio for the priority and non-priority endpoints 30/35 differently and determines if the designation for priority endpoint 30 should be changed depending on current circumstances.

Figure 2:
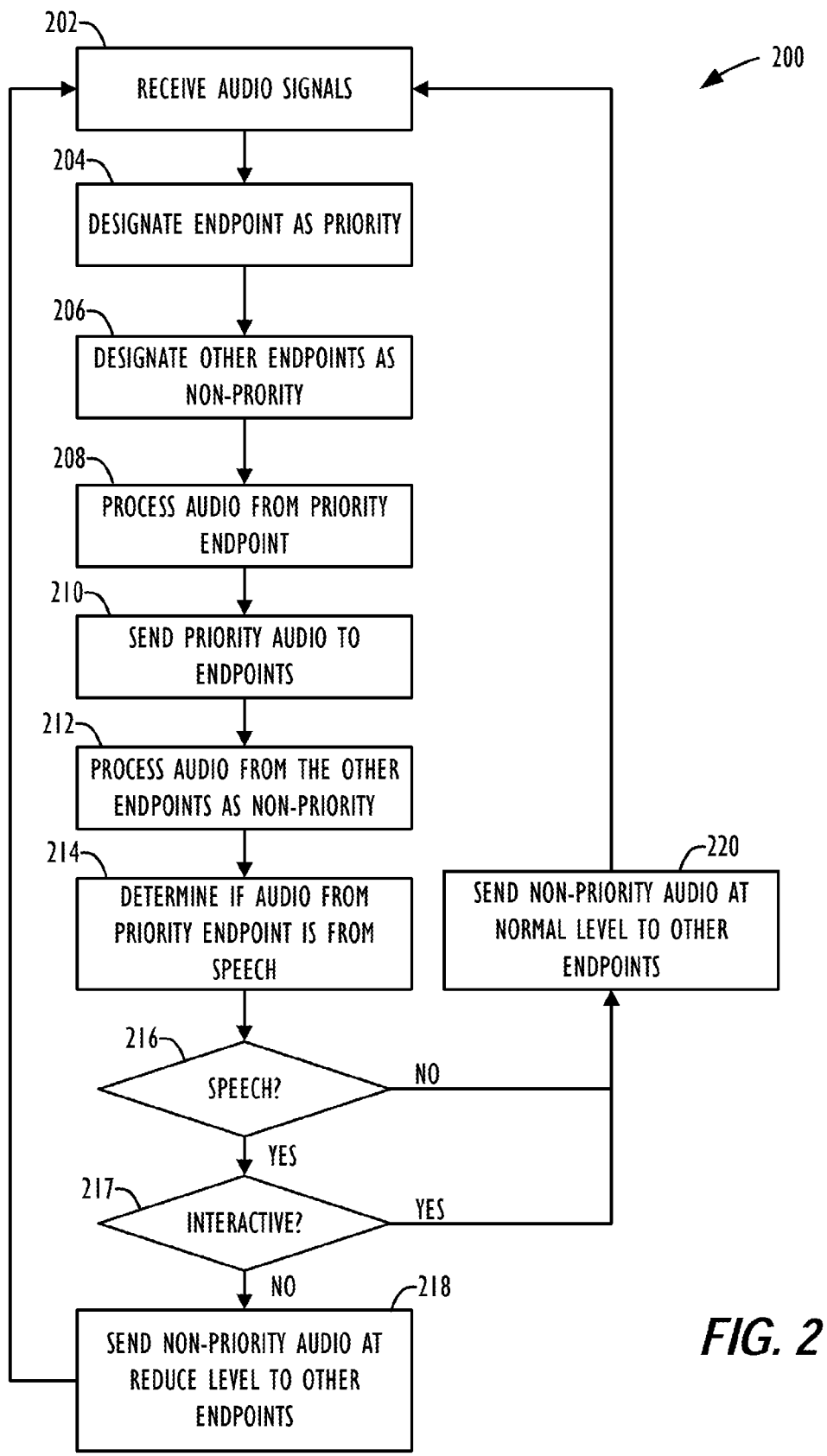
FIG. 2 shows a process for handling priority and non-priority endpoints in a multipoint conference.

For example, a process 200 in FIG. 2 shows one way the MCU 50 can handle audio from priority and non-priority endpoints 30/35 during a conference. Initially, the network interface 56 of the MCU 50 receives multimedia communications from the endpoints 20 via the network 40 and processes the multimedia communications according to an appropriate communication standard (Block 202). At some point during the conference, a participant at one of the endpoints 20 may wish to present information by speaking or providing other forms of audio. Unfortunately, if any noise or talking is present at the other endpoints 20, that undesirable audio can become part of the conference audio and can disrupt and detract from the presenter's audio.

To alleviate this problem, the MCU 50 designates at least one endpoint 20 as a priority endpoint 30 during the conference (Block 204) and designates one or more second endpoints 20 as non-priority endpoints 35 (Block 206). Determining which endpoint to designate as the priority endpoint 30 can take a number of forms as discussed below. In general, the designation can be initially performed when reserving the conference, starting the conference, or connecting one of the endpoints 20 to the MCU 50. Additionally, the designation of priority and non-priority endpoints 30/35 can be made repeatedly at subsequent intervals during the conference to handle the dynamic nature of the conference.

In one technique for designating a priority endpoint 30, a manual request may be sent from an endpoint 20 to the MCU 50 to change from being a non-priority designation to a priority designation. This manual request can be made by a user at the endpoint 20 or can be made by the endpoint 20 itself based on techniques disclosed herein. Based on such a request, the MCU 50 can then determine whether the request can or should be implemented.

In another technique, the MCU 50 can automatically determine which endpoint 20 to designate as priority based on which endpoint 20 has a current duration of audio indicative of speech that is longer than other endpoints 20. In yet another technique, the designation of priority endpoint 30 can be based on which endpoint 20 is currently presenting visual content during the conference.

When the priority designation 32 is set, the MCU 50 processes and sends audio from the priority endpoint 30 differently than audio from the non-priority endpoints 35. In particular, the MCU 50 processes the input audio from the priority endpoint 30 as priority audio for the conference (Block 208) and sends this priority audio to the other endpoints 20 (whether priority or not) without muting or reducing the priority audio's output level (Block 210).

However, the MCU 50 handles the non-priority endpoints 35 differently. The MCU 50 processes the input audio from the non-priority endpoints 35 (Block 212). Then, before sending out this audio, the MCU 50 determines whether the first input audio from the priority endpoint 30 being currently processed is from speaking or not (Block 214).

If a participant at the priority endpoint 30 is speaking (Decision 216), then the MCU 50 sends the non-priority output audio from the non-priority endpoints 35 to the other endpoints 20 (whether priority or not) at a controlled (reduced or muted) audio level (Block 218). The amount of reduction of the output audio may vary depending on the implementation. As one example, the output audio may be reduced as much as 80%. In this way, the priority endpoint 30's audio has priority over other audio and can be heard over any distracting conversations or noise that may be introduced from the non-priority endpoints 35. In general, the non-priority audio can be sent at such a reduced level for a set amount of time or for as long as the priority endpoint 30 is presenting (i.e., speaking).

When and if the participant at the priority endpoint 30 is not speaking (Decision 216), however, the MCU 50 sends the non-priority output audio to the endpoints 20 (whether priority or not) at a normal level (Block 220). Alternatively, the output audio may be reduced to some degree that can be configured in attempt to reduce background noise. Sending the output audio for the non-priority endpoints 35 to normal levels may be done, for example, after a fixed amount of time of silence from the priority endpoint 30 (i.e., when the presenter at this endpoint 30 has stopped speaking for a time).

At some point during the conference, a situation may arise where several participants are speaking either at the same time or nearly at the same time. For example, this may happen when participants are talking with one another interactively in a lively discussion. In such a situation, the process 200 may be unable to determine a priority endpoint. In fact, it may be preferred in such a situation that the process 200 not mute or reduced the audio of any of the endpoints. Therefore, at some point during a conference, the process 200 may remove or ignore any priority/non-priority designations and may allow the conference to proceed without muting or reducing audio levels. This may proceed for a predetermined amount of time or until a definitive designation can be made.

As shown in FIG. 2, for example, the process 200 may determine whether an interactive discussion is occurring in the conference (Decision 217). If not, then the process 200 can continue to send non-priority audio at reduced levels as before so that the priority endpoint's speech is emphasized (Block 218). Yet, if an interactive discussion is occurring, then the process 200 may simply send the non-priority audio at normal levels, essentially ignoring the priority designation (Block 220). Determining whether an interactive discussion is occurring can be based on the number of endpoints currently having audio indicative of speech, how long that speech audio has proceeded overtime, how often speech audio occurs in proximity in time from one endpoint to the next, and other factors that depend on the implementation. Accordingly, the process 200 can use timing schemes such as described later to determine if an interactive discussion is currently occurring in the conference.

Overall, the entire process 200 can be repeated at regular intervals during the conference to handle the priority and non-priority audio levels dynamically and automatically. In this way, the MCU 50 does not require an operator at the MCU 50 to mute the audio manually for the non-priority endpoints 35. Likewise, the individual participants at the non-priority endpoints 35 do not have to mute their microphones manually because relying on participants to do this can be unreliable.

Figure 3:
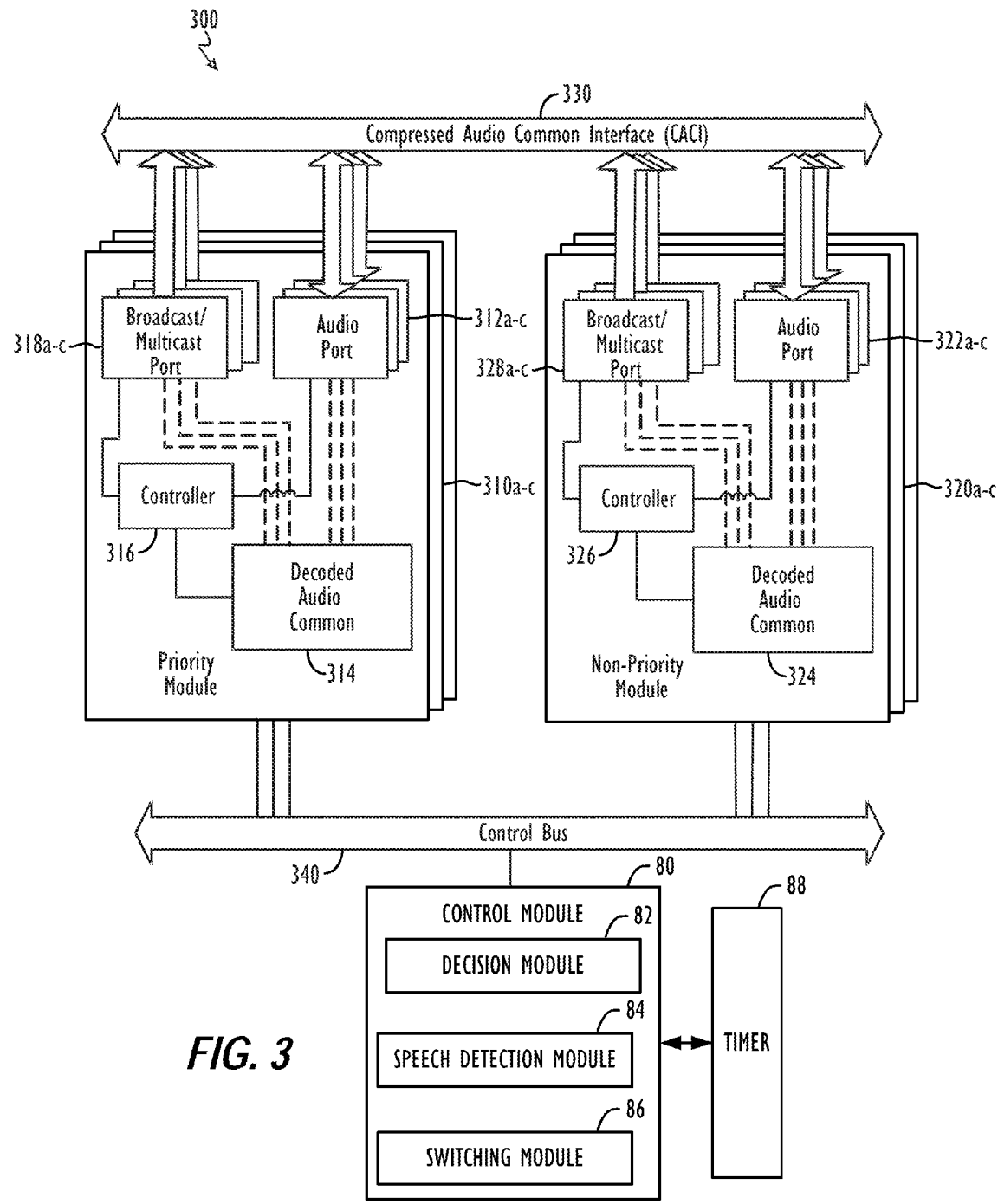
FIG. 3 illustrates an audio module and other components of a multipoint control unit.

As noted previously, the MCU 50 handles audio for the endpoints 20 differently based on priority or non-priority designations. An example of how the MCU 50 handles audio is shown in FIG. 3, which illustrates a block diagram of MCU's audio module 300. The control module (50) controls the audio module 300 via a control bus 340, and the audio module 300 processes and prepares audio for transmission to the endpoints (20). To handle the audio differently, the audio module 300 uses a compressed audio common interface (CACI) 330, one or more priority modules 310*a-c*, and one or more non-priority modules 320*a-c*.

The priority modules 310*a-c* are designated for priority endpoints (30) that have their output audio handled with priority during the conference. Each priority module 310*a-c* can have one or more audio ports 312*a-c*, a Decoded Audio Common Interface (DACI) 314, one or more broadcast/multicast ports (BMP) 318*a-c*, and a controller 316. (The DACI 314 enables data to be shared among destinations.)

For their part, the non-priority modules 320*a-c* are designated for non-priority endpoints (35) that do not have their audio handled with priority during the conference. Each non-priority module 320*a-c* is similar to the priority modules 310 so these modules 320 can have one or more audio ports 322*a-c*, a Decoded Audio Common Interface (DACI) 324, one or more broadcast/multicast ports (BMP) 328*a-c*, and a controller 326.

Because the designations of which endpoints (20) are priority or non-priority can change during a conference, the number of modules 310/320 and the endpoints (20) to which they are associated can change during the conference. In general, each module 310/320 can be a logic unit, a hardware module, a firmware module, a software module, a DSP, or any combination of these. Moreover, each module 310/320 can be permanent or temporary, and the number of modules 310/320 may change during a conference, as controlled by the control module 80 and determined based on current needs. For example, a "small" conference may need only one priority module (e.g., 310a) having several audio ports 312a-c with one audio port 312 for each endpoint (20) participating in the conference. In this case, the priority module 310a for the small conference may not have a BMP 318. On the other hand, a "large" conference may need several priority modules 310a-c having both audio ports 312a-c and BMPs 318a-c.

During a conference, endpoints (20) connected to the MCU (50) send their compressed audio streams to the priority and non-priority modules 310/320 via the MCU's network interface (56) and the CACI 330, depending on how the endpoints (20) are designated in the conference. In addition, the endpoints (20) receive compressed audio streams from the appropriate audio ports 312/322 or BMPs 318/328 via the CACI 330 and the network interface modules (not shown).

For its part, the CACI 330 transfers the compressed audio streams between the priority and non-priority modules 310/320, the audio ports 312/322, the BMPs 318/328, and the network interface module (56) depending on how the conference is managed and arranged. Yet, the control module 80 controls operation of the audio module 300 via the control bus 340. The control module 80 can be a host computer or an internal module of the MCU (50). As schematically shown, the control module 80 has a decision module 82, a speech detection module 84, a switching module 86, and a timer 88, which will be discussed in more detail below.

Figure 4:
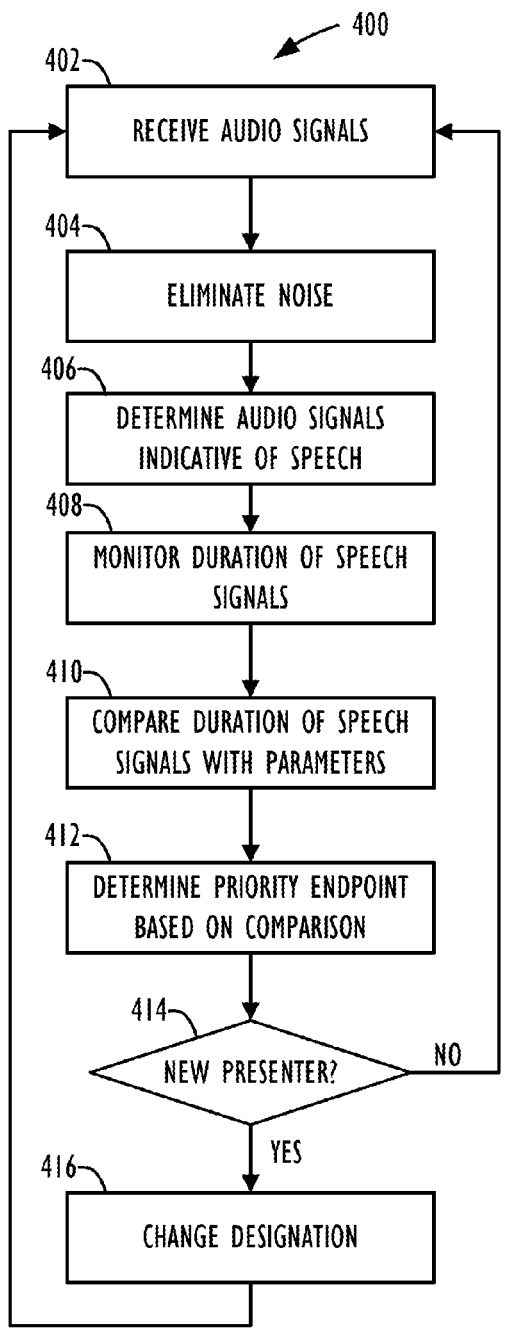
FIG. 4 illustrates a process for automatically handling audio priority during a conference according to the present disclosure.

As discussed previously, determining which endpoint (20) to designate as priority can be done automatically. As shown in FIG. 4A, one automated process 400 uses the duration of audio signals indicative of speech to automatically determine and switch the designated priority endpoint (30) during a conference. In the process 400, the MCU (50) receives signals from each of endpoints (20) during the conference (Block 402), and the MCU (50) can eliminate noise from the received signals using standard algorithms to improve processing (Block 404). The signals handled here in this process 400 may be samples of the audio signals intended for the conference so they can be processed separately from the actual conference audio. For example, the control module 80 of FIG. 3 may sample audio signals from the audio ports 312/322 in the modules 310/320 to obtain signals for processing.

At this point, the MCU (50) determines which audio signals from any of the endpoints (20) is indicative of speech (Block 406). As shown in FIG. 3, for example, speech detection can be performed by the speech detection module 84 of the control module 80 in the MCU 50. In general, the detection can use techniques known in the art, and various forms of processing may done to the audio signals to help detect speech. For example, a filter band (not shown) may filter the audio signals into separate bands to be monitored, and samples of each band may be taken for processing to reduce computation requirements. From this point, the filtered and sampled bands can be compared to thresholds and parameters to detect speech. Some techniques for detecting speech are disclosed in U.S. Pat. Nos. 6,453,285 and 6,351,731, which are incorporated herein by reference in their entireties.

If speech is detected (Block 406), the MCU (50) monitors the duration of the speech signals from the associated endpoint(s) (20) using the control module's timer (88) (Block 408), and the duration of each monitored signal is compared to predefined parameters (Block 410). These parameters can include time limits that the monitored signal's duration must exceed, audio thresholds that the monitored signal must surpass, etc. In general, a given endpoint (20) is considered priority when a speaker at the given endpoint (20) is the sole speaker during the conference for a duration of speech exceeding some particular time limit.

In any event, the MCU (50) determines one of the endpoints (20) as priority endpoint (30) based on the comparison (Block 412) so its audio and the audio of non-priority endpoints (35) can be handled differently. Once determined, the control module 80 compares which endpoint is currently designated priority to that which is newly determined priority (Decision 414). If they are the same, then the switching module (86) does not perform any switching, and the process 400 can return to receiving audio signals for processing and determining if a new priority endpoint (30) exists (Block 402).

If, however, a new endpoint is to be designated priority (Decision 414), then the switching module (88) switches the current designation of priority endpoint (Block 416). To implement the changed designation, the control module (80) can send commands to the audio modules (310/320) directing them to alter how they handle their output audio based on the designation of the associated endpoints (30). As discussed previously, when an endpoint is designated as priority endpoint (30), then audio from that endpoint (30) will not be reduced or muted for a predetermined amount of time as long as it remains priority. When an endpoint is designated as non-priority endpoint (35), then audio from that endpoint (35) will be either reduced or muted for a predetermined amount of time as long as it remains non-priority.

In FIG. 3, for example, the switching module (86) can send commands to the controllers (316/326) of the modules (310/320). Based on the priority designation, the controller (316) of a priority module (310) will process its audio and send its output audio at normal levels. However, the controller (326) of a non-priority module (320) will process its audio and send its output audio at reduced levels based on the non-priority designation.

Figure 5:
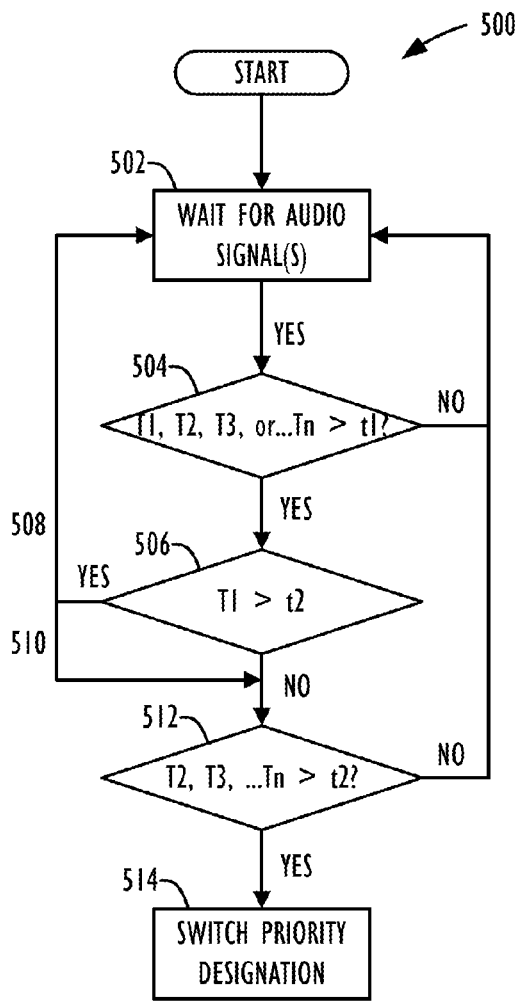
FIG. 5 illustrates a process for automatically handling audio priority when there are multiple participants speaking.

A given conference can have multiple participants that may talk at the same time, and the MCU (50) may have to monitor the audio from numerous endpoints (20) to determine the priority endpoint (30) from among the non-priority endpoints (35). For example, there may be situations where the priority endpoint (30) is providing speech audio, but one or more other non-priority endpoints (35) may also have speech audio. To handles such situations, the MCU (50) can use a timing scheme 500 as shown in FIG. 5 to compare the duration of speech between multiple endpoints (20) and to determine whether to switch the priority designation.

The timing scheme 500 is shown as applied to a current priority endpoint (30) having a signal of duration $T_1$ (T refers to the duration of speech signal from an endpoint). Other non-priority endpoints (35) can have signals of duration $T_2$, $T_3$, ... $T_n$. Based on the durations, the switching module (86) continuously compares the speech durations received from the endpoints to determine whether to change which endpoint is designated priority.

Initially, the switching module (86) waits for speech signals from one or more than one of the endpoints during the conference (Block 502). For example, the priority endpoint (30) may have a speech signal with a first duration $T_1$, while one or more of the non-priority endpoints (35) may or may not have speech signals with other durations $T_2, T_3, \ldots T_n$. First, the timing scheme 500 determines if the speech duration $T_1$, $T_2, T_3, \ldots T_n$ for any of the endpoint's exceeds a first threshold $t_1$ (Decision 504). If none do, then the scheme 500 can return to waiting for speech signals (Block 502). This may occur when the speech durations for all of the endpoints are not long enough to determine a distinctive priority endpoint.

If any of the speech signals has a duration that exceeds the first threshold $t_1$ (Decision 504), then the switching module (86) determines whether the speech duration $T_1$ for the priority endpoint (30) currently exceeds a second, longer threshold $t_2$ (Decision 506). If it does, then the timing scheme 500 may return to waiting for audio signals (Block 502) according to one option (508). In this instance, the second threshold $t_2$ may represent a long enough duration so it can be assumed that the priority endpoint (30) should remain priority because the participant has spoken for a sufficient length of time. This may be so regardless of whether a non-priority endpoint (35) has speech audio of any duration.

Alternatively, the timing scheme 500 may use another option (510) even if the priority endpoint's duration $T_1$ exceeds the second threshold $t_2$ to check if any of the non-priority endpoints (35) has a speech duration $T_2, T_3, \ldots T_n$ exceeding the second threshold $t_2$ (Decision 512). Therefore, if the speech duration $T_1$ for the priority endpoint (35) does not exceed the second threshold $t_2$ (or even if it does), then the timing scheme 500 determines whether any of the other endpoints (35) have a speech duration $T_2, T_3, \ldots T_n$ that exceeds the second threshold $t_2$ (Decision 512). If none do, then none of the speakers at the non-priority endpoints (35) is distinctively a priority speaker. In this case, the switching module (86) maintains the current priority designation and returns to waiting for speech signals (Block 502).

However, if one of the speech durations $T_2, T_3, \ldots T_n$ exceeds the second threshold $t_2$ (Decision 512), then the switching module (86) elects to switch the priority designation (Block 514). At this point, if the priority endpoint's duration $T_1$ does not exceed the second threshold $t_2$, then the switching module (86) may determine which of the non-priority endpoints (35) has the longer speech duration $T_2, T_3, \ldots T_n$ and may designate that endpoint (35) as priority. In the case where the priority endpoint's duration $T_1$ does exceed the second threshold $t_2$ and one or more other endpoint's duration $T_2, T_3, \ldots T_n$ also exceeds the second threshold $t_2$, each of the durations $T_1, T_2, T_3, \ldots T_n$ may be compared to yet a third longer threshold or to one another to determine the longest duration and the priority designation.

As discussed above, $t_1$ is an initial threshold that can prevent the priority designation from being switched when unnecessary because the speech durations from any of the endpoints is simply too short to warrant making a change. Therefore, the initial threshold $t_1$ does allow other non-priority endpoints (35) to make momentary interruptions of the priority endpoint (30). Such momentary interruptions often occur in real-life conferences when a speaker coughs or verbally reacts to another speaker's statement, for example. Therefore, if speakers comment or react to statements with an utterance of their own, a determination of whether to change the priority designation will not proceed unless their comment exceeds the initial threshold $t_1$.

On the other hand, the second duration $t_2$ as discussed above is intended to indicate that there is a distinctive speaker who can be given priority during the conference. In a non-limiting example, the first threshold $t_1$ can be 2 seconds, while the second threshold $t_2$ can be 15 seconds. Of course, these time thresholds are meant to be exemplary and may differ depending on the implementation. Moreover, these and other thresholds and parameters discussed herein can be manually configurable or automatically adjusted.

Figure 6:
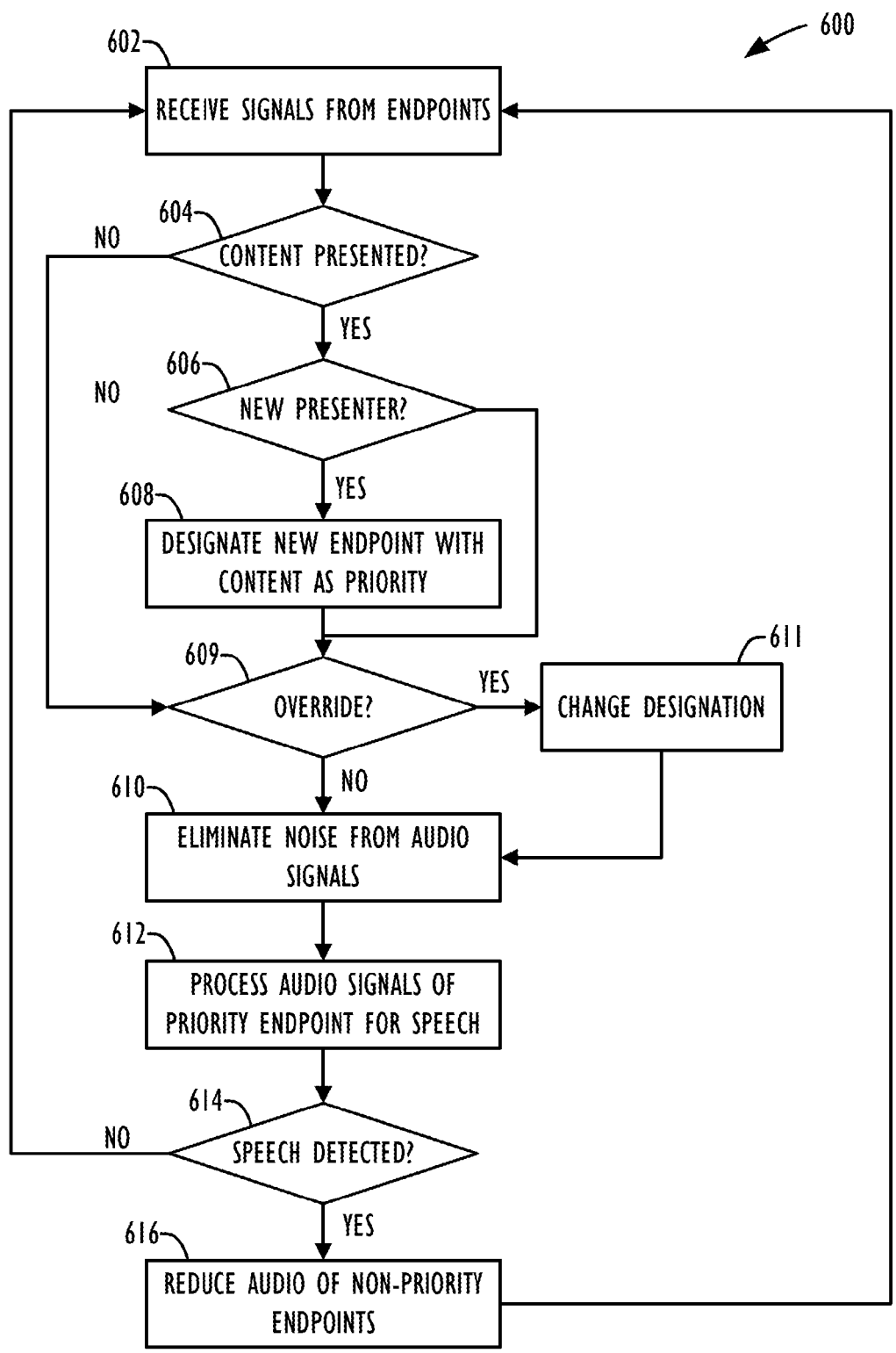
FIG. 6 illustrates another process for designating a priority endpoint during a conference based on which endpoint is presenting content.

Designating the priority endpoint (30) based on the duration of the speech from the various endpoints can be repeated during the conference at suitable intervals. In addition or alternative to this form of designation, determining priority can be based on which endpoint is presenting content. For example, FIG. 6 illustrates a process 600 for designating a priority endpoint (30) during a conference based on which endpoint is presenting content. Initially, the MCU (50) receives multimedia signals from endpoints (20) (Block 602). At this stage in the process 600, it is assumed that one of the endpoints is already designated as priority endpoint (30). After receiving the signals, the MCU (50) determines whether one of the endpoints (20) is currently presenting content (Decision 604). If not, then the MCU (50) can proceed to process audio signals based on the existing priority designation. This step can be performed in steps discussed below or using the other techniques disclosed herein.

If content is being presented (Decision 604), however, then the MCU (50) determines whether the endpoint presenting content is a new presenter (i.e., not already designated as priority endpoint (30)) (Decision 606). If the priority endpoint (30) is the one presenting content, then the MCU (50) keeps the existing priority designation unchanged and proceeds to the steps for processing audio discussed below.

If the endpoint presenting content is new, then the MCU (50) may designate the new endpoint as the priority endpoint (30) by default, essentially flagging that new endpoint's status with a priority token (Block 608). Accordingly, a given conference may have only one priority token that can be switched from one endpoint to another during the conference based on which endpoint is presenting content and/or speaking. Thus, any new presenter of content may be assumed to have priority during the conference.

At this stage, however, the process 600 can further determine whether one of the other endpoints has audio indicative of speech and can use the techniques disclosed herein to determine whether this endpoint should be designated with priority. For example, a participant at one endpoint (i.e., either a new or older content presenter) may be presenting content during the conference, but a participant at another endpoint may be the one discussing the content at length, providing some discussion, or asking a question. In this situation, priority should be given to the endpoint providing speech regardless of whether it is presenting content or not.

Therefore, the process 600 can determine whether the current priority designation based at least on content should be changed (Decision 609). If so, then the priority designation is changed (Block 611). In this way, audio indicative of speech from an endpoint can essentially override or take precedence over a priority designation based solely on content presentation. Otherwise, the designation may remain unchanged, and the process 600 continues.

Continuing with processing of audio, the MCU (50) eliminates noise from the audio signal of the priority endpoint (Block 610) and processes the audio from the priority endpoint (30) for speech (Block 612). If the MCU (50) detects speech (Decision 614), then the MCU (50) reduces or mutes the audio of non-priority endpoints (35) (Block 616). Otherwise, reducing the audio of the other endpoints (35) may not be necessary so the process 600 returns to receiving signals for processing (Block 602). In this way, when the participant at the priority endpoint (30) is presenting content but not speaking, audio for the non-priority endpoints (35) can be handled normally, allowing participants to participate or interject in the conference. If, however, the participant at the priority endpoint (30) is presenting content and is speaking, audio for the non-priority endpoints (35) can be reduced so as not to interfere with the participant at the priority endpoint (30).

The techniques of the present disclosure can be implemented in electronic circuitry, computer hardware, firmware, software, or in any combinations of these. For example, the disclosed techniques can be implemented as instruction stored on a program storage device for causing a programmable control device to perform the disclosed techniques. Program storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits). In addition, the disclosed techniques can be implemented using one or more general-purpose machines (e.g., a conferencing terminal, a multipoint control unit, a computer, etc.) and appropriate software, which may be stored on a computer readable medium, including, for example, optical disks, magnetic disks or tapes, solid-state memory devices (ROM or RAM), etc. Likewise, the disclosed techniques can be implemented using one or more special-purpose machines, such as a conferencing terminal, a multipoint control unit, a server, a special-purpose computer, a general-purpose computer with appropriate software programming, or a functional module within a general-purpose machine.

The foregoing description of preferred and other embodiments is not intended to limit or restrict the scope or applicability of the inventive concepts conceived of by the Applicants. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A conferencing method, comprising:
   designating endpoints in a conference as at least one priority endpoint and as one or more non-priority endpoints at a control unit;
   generating priority output audio at the control unit using priority input audio from the at least one priority endpoint;
   sending the priority output audio for the conference from the control unit;
   generating non-priority output audio at the control unit using non-priority input audio from the one or more non-priority endpoints;
   determining at the control unit whether the priority input audio is indicative of speech; and
   sending the non-priority output audio for the conference from the control unit, the non-priority output sent at a controlled level when the priority input audio is indicative of speech.

2. The method of claim 1, wherein the conference is an audio conference, a video conference, or a mixed audio and video conference.

3. The method of claim 1, wherein designating the priority and non-priority endpoints is initially performed when reserving the conference, starting the conference, or connecting one of the endpoints to the control unit.

4. The method of claim 1, wherein designating the priority and non-priority endpoints is performed repeatedly during the conference.

5. The method of claim 1, further comprising:
   determining at the control unit when the priority input audio is not indicative of speech whether the non-priority input audio from one of the non-priority endpoints is indicative of speech; and
   changing the priority designation based on the determination.

6. The method of claim 1, wherein generating the priority input audio comprises reducing noise from the priority input audio.

7. The method of claim 1, wherein determining whether the priority input audio is indicative of speech comprises processing the priority input audio and comparing the processed audio to parameters indicative of speech.

8. The method of claim 1, wherein sending the priority output audio comprises combining the priority and non-priority output audio together as conference audio, wherein the priority output audio is at an unreduced level in the conference audio.

9. The method of claim 1, wherein sending the non-priority output audio comprises combining the priority and non-priority output audio together as conference audio, wherein the non-priority output audio is at the controlled audio level in the conference audio.

10. The method of claim 1, wherein designating the priority and non-priority endpoints comprises:
    determining at the control unit whether at least one of the endpoints is presenting content during conference;
    designating the at least one endpoint presenting content as the at least one priority endpoint.

11. The method of claim 10, further comprising:
    determining at the control unit whether the input audio from one of the other endpoints is indicative of speech; and
    changing the priority designation from the endpoint presenting content to the endpoint having the input audio indicative of speech.

12. The method of claim 1, further comprising sending the non-priority output audio for the conference from the control unit at an unreduced audio level when the priority input audio is not indicative of speech.

13. The method of claim 1, wherein determining whether the priority input audio is indicative of speech comprises determining at the control unit whether the input audio from two or more of the endpoints is indicative of speech.

14. The method of claim 13, further comprising sending the priority and non-priority output audio at controlled audio levels when the input audio from the two or more of the endpoints is indicative of speech.

15. The method of claim 13, further comprising:
    determining which of the two or more endpoints has a longer duration of the input audio indicative of speech; and
    designating the endpoint with the longer duration as the priority endpoint.

16. The method of claim 15, wherein determining the longer duration comprises:
    comparing the input audio from the two or more endpoints relative to one another or to one or more threshold; and
    maintaining or changing the priority designation based on the comparison.

17. A programmable storage device having programmed instructions stored thereon for causing a programmable control device to perform a conferencing method comprising:

designating endpoints in a conference as at least one priority endpoint and as one or more non-priority endpoints at a control unit;

generating priority output audio at the control unit using priority input audio from the at least one priority endpoint;

sending the priority output audio for the conference from the control unit;

generating non-priority output audio at the control unit using non-priority input audio from the one or more non-priority endpoints;

determining at the control unit whether the priority input audio is indicative of speech; and sending the non-priority output audio for the conference from the control unit, the non-priority output sent at a controlled level when the priority input audio is indicative of speech.

18. A conferencing control unit, comprising:

at least one network interface in communication with a plurality of endpoints during a conference via at least one network;

an audio interface in communication with the at least one network interface and handling input and output audio for the conference; and a processing unit in communication with the audio interface and determining at least one of the endpoints as having priority, the processing unit sending first audio of the at least one priority endpoint for the conference with the audio interface, the processing unit determining whether input audio from the priority endpoint is indicative of speech, the processing unit sending second audio of the one or more non-priority endpoints for the conference with the audio interface, the second audio being sent at a controlled level based on the determination.

19. The control unit of claim 18, wherein the conference is an audio conference, a video conference, or a mixed audio and video conference.

20. The control unit of claim 18, wherein the processing unit allocates resources of the audio interface based on the priority designation.

21. The control unit of claim 18, wherein the processing unit initially determines the priority endpoint when the conference is reserved, when the conference is started, or when one of the endpoints connects to the control unit.

22. The control unit of claim 18, wherein the processing unit determines the priority endpoint repeatedly during the conference.

23. The control unit of claim 21, wherein the processing unit changes the priority designation if the input audio from the priority endpoint is not indicative of speech and input audio from one of the non-priority endpoints is indicative of speech.

24. The control unit of claim 18, wherein to determine the priority endpoint, the processing unit determines whether at least one of the endpoints is presenting content during conference and designates that endpoint as having priority.

25. The device of claim 17, wherein the conference is an audio conference, a video conference, or a mixed audio and video conference.

26. The device of claim 17, wherein designating the priority and non-priority endpoints is initially performed when reserving the conference, starting the conference, or connecting one of the endpoints to the control unit.

27. The device of claim 17, wherein designating the priority and non-priority endpoints is performed repeatedly during the conference.

28. The device of claim 17, further comprising:

determining at the control unit when the priority input audio is not indicative of speech whether the non-priority input audio from one of the non-priority endpoints is indicative of speech; and changing the priority designation based on the determination.

29. The device of claim 17, wherein generating the priority input audio comprises reducing noise from the priority input audio.

30. The device of claim 17, wherein determining whether the priority input audio is indicative of speech comprises processing the priority input audio and comparing the processed audio to parameters indicative of speech.

31. The device of claim 17, wherein sending the priority output audio comprises combining the priority and non-priority output audio together as conference audio, wherein the priority output audio is at an unreduced level in the conference audio.

32. The device of claim 17, wherein sending the non-priority output audio comprises combining the priority and non-priority output audio together as conference audio, wherein the non-priority output audio is at the controlled audio level in the conference audio.

33. The device of claim 17, wherein designating the priority and non-priority endpoints comprises:

determining at the control unit whether at least one of the endpoints is presenting content during conference;

designating the at least one endpoint presenting content as the at least one priority endpoint.

34. The device of claim 33, further comprising:

determining at the control unit whether the input audio from one of the other endpoints is indicative of speech; and changing the priority designation from the endpoint presenting content to the endpoint having the input audio indicative of speech.

35. The device of claim 17, further comprising sending the non-priority output audio for the conference from the control unit at an unreduced audio level when the priority input audio is not indicative of speech.

36. The device of claim 17, wherein determining whether the priority input audio is indicative of speech comprises determining at the control unit whether the input audio from two or more of the endpoints is indicative of speech.

37. The device of claim 36, further comprising sending the priority and non-priority output audio at controlled audio levels when the input audio from the two or more of the endpoints is indicative of speech.

38. The device of claim 36, further comprising:

determining which of the two or more endpoints has a longer duration of the input audio indicative of speech; and designating the endpoint with the longer duration as the priority endpoint.

39. The device of claim 38, wherein determining the longer duration comprises:

comparing the input audio from the two or more endpoints relative to one another or to one or more threshold; and maintaining or changing the priority designation based on the comparison.

* * * * *